US007839355B2

(12) United States Patent
Lavelle et al.

(10) Patent No.: US 7,839,355 B2
(45) Date of Patent: Nov. 23, 2010

(54) VEHICLE DISPLAY DEVICE HAVING A WIRELESS TRANSMITTER

(75) Inventors: Patrick M. Lavelle, Sayville, NY (US); Thomas C. Malone, Miller Place, NY (US); James R. Tranchina, Dix Hills, NY (US)

(73) Assignee: Audiovox Corporation, Hauppauge, NY (US)

( * ) Notice: Subject to any disclaimer, the term of this patent is extended or adjusted under 35 U.S.C. 154(b) by 1231 days.

(21) Appl. No.: 10/926,671

(22) Filed: Aug. 26, 2004

(65) Prior Publication Data

US 2005/0024356 A1 Feb. 3, 2005

Related U.S. Application Data

(63) Continuation-in-part of application No. 09/698,918, filed on Oct. 27, 2000, now abandoned.

(51) Int. Cl.
G09G 5/00 (2006.01)
(52) U.S. Cl. .................. 345/7; 345/156; 345/204; 455/345
(58) Field of Classification Search ............... 345/7–9, 345/156, 204; 455/345, 569.2
See application file for complete search history.

(56) References Cited

U.S. PATENT DOCUMENTS

| 4,836,478 | A | 6/1989 | Sweere .................... 248/1 |
| 4,982,996 | A | 1/1991 | Vottero-Fin et al. |
| 5,529,265 | A * | 6/1996 | Sakurai ................... 244/118.5 |
| 5,610,822 | A | 3/1997 | Murphy .................... 701/211 |
| 5,793,413 | A | 8/1998 | Hylton et al. ............... 725/118 |
| 5,918,183 | A * | 6/1999 | Janky et al. ............. 455/456.1 |
| 6,058,288 | A | 5/2000 | Reed et al. |
| 6,097,448 | A * | 8/2000 | Perkins ...................... 348/837 |
| 6,102,476 | A | 8/2000 | May et al. |
| 6,134,223 | A | 10/2000 | Burke et al. ............. 348/14.08 |

(Continued)

FOREIGN PATENT DOCUMENTS

EP 0 510 541 B1 10/1992

(Continued)

OTHER PUBLICATIONS

International Search Report and Written Opinion of the International Searching Authority for International Appln. No. PCT/US05/30346, International Filing Date of Aug. 25, 2005.

(Continued)

*Primary Examiner*—Kimnhung Nguyen
(74) *Attorney, Agent, or Firm*—F. Chau & Associates, LLC

(57) ABSTRACT

There is provided a display device for a vehicle having a seat. The display device includes an assembly housing adapted to mount at a rear portion of the seat. A receiver is adapted to receive at least one of video and audio signals from at least one external input device. At least one wireless transmitter operatively coupled to the receiver, is adapted to wirelessly transmit the audio signals to at least one wireless headphone set. The display device is adapted to reproduce the video signals. In some embodiments of the invention, the at least one wireless transmitter is adapted to transmit the audio signals based on Code-Division Multiple Access (CDMA) technology.

42 Claims, 4 Drawing Sheets

U.S. PATENT DOCUMENTS

| | | | |
|---|---|---|---|
| 6,300,880 B1 | 10/2001 | Sitnik | 235/375 |
| 6,301,367 B1 | 10/2001 | Boyden et al. | 2/209 |
| 6,317,039 B1 | 11/2001 | Thomason | 340/505 |
| 6,337,913 B1 | 1/2002 | Chang | 370/343 |
| 6,380,978 B1 | 4/2002 | Adams et al. | 348/448 |
| 6,406,334 B2 | 6/2002 | Chu | |
| 6,419,379 B1 | 7/2002 | Hulse | 362/488 |
| 6,587,127 B1 | 7/2003 | Leeke et al. | |
| 6,724,317 B1 | 4/2004 | Kitano et al. | |
| 2003/0229897 A1 | 12/2003 | Frisco et al. | 725/76 |
| 2004/0130616 A1 | 7/2004 | Tseng | |

FOREIGN PATENT DOCUMENTS

| | | |
|---|---|---|
| EP | 1 391 349 A1 | 2/2004 |
| WO | WO 02/087924 A1 | 11/2002 |

OTHER PUBLICATIONS

Office Action mailed Jan. 10, 2008 form U.S. Appl. No. 10/912,008.

Office Action mailed Jan. 28, 2004 from corresponding U.S. Appl. No. 09/698,918 now abandoned.

Office Action mailed Jul. 30, 2003 from corresponding U.S. Appl. No. 09/698,918 now abandoned.

Office Action mailed Feb. 11, 2003 from corresponding U.S. Appl. No. 09/698,918 now abandoned.

Office Action mailed Jul. 8, 2002 from corresponding U.S. Appl. No. 09/698,918 now abandoned.

Office Action mailed Jun. 11,2008 from corresponding U.S. Appl. No. 11/404,681.

Office Action mailed Dec. 17, 2008 from corresponding U.S. Appl. No. 10/912,008.

Office Action mailed Dec. 26, 2008 from corresponding U.S. Appl. No. 11/404,681.

Office Action mailed Jun. 9, 2009 relating to U.S. Appl. No. 10/912,008.

* cited by examiner

VEHICLE DISPLAY DEVICE HAVING A WIRELESS TRANSMITTER

CROSS-REFERENCE TO RELATED APPLICATION

This application is a Continuation-In-Part of U.S. application Ser. No. 09/698,918, filed on Oct. 27, 2000, now abandoned the disclosure of which is incorporated herein in its entirety by reference.

1. TECHNICAL FIELD

The present invention relates generally to vehicles and, in particular, to a display device for a vehicle. The display device mounts at a rear portion of a vehicle seat, with audio being supplied to the vehicle passengers by a wireless transmitter included in the display device. The passengers receive the transmitted audio through wireless headphones.

2. BACKGROUND DESCRIPTION

As cars have been continuously updated to include new and useful features for the enjoyment and/or utility of a driver and his or her passengers, devices generally found in the home have made their way into cars as optional features. Such features include the television, the video cassette player (VCP), the compact disk (CD) player, and the digital video disk (DVD) player. These features undoubtably provide enjoyment and/or utility to the driver and/or passengers of a vehicle. For example, children may become occupied by, for example, watching a moving and, thus, may leave the driver better able to concentrate on operating the vehicle. Moreover, passengers in a vehicle undertaking a long journey may better pass the time by viewing a movie.

However, it has generally been the case that the viewing of a movie in a vehicle includes the playing of any corresponding audio on the vehicle's existing sound system or on a sound system of the reproducing device (e.g., integrated television/video cassette player). Such an arrangement may interrupt those passengers who wish to have a quiet environment, such as those passengers intending to, for example, read or sleep during the trip.

Accordingly, there is a need for vehicle display device which provides an audio output to only those passengers intent on receiving the same.

SUMMARY OF THE INVENTION

The problems stated above, as well as other related problems of the prior art, are solved by the present invention, a display device for a vehicle. The display device mounts at a rear portion of a vehicle seat, with audio being supplied to the vehicle passengers by a wireless transmitter included in the display device. The passengers receive the transmitted audio through wireless headphones.

According to a first aspect of the invention, there is provided a display device for a vehicle having a seat. The display device includes an assembly housing adapted to mount at a rear portion of the seat. A receiver is adapted to receive at least one of video and audio signals from at least one external input device. At least one wireless transmitter operatively coupled to said receiver, is adapted to wirelessly transmit the audio signals to at least one wireless headphone set. The display device is adapted to reproduce the video signals.

According to a second aspect of the invention, the wireless signals are at least one of radio frequency and infrared signals.

According to a third aspect of the invention, the receiver receives an input signal from an external media source.

According to a fourth aspect of the invention, the external media source includes at least one of a television tuner, a video cassette player (VCP), a compact disk (CD) player, a digital video disk (DVD) player, an AM/FM radio, a video game player, global navigation data, and e-mail.

According to a fifth aspect of the invention, the display device further includes signal processing facilities adapted to perform at least one of signal processing and signal conversion, with respect to at least one of the audio signals and the video signals.

According to a sixth aspect of the invention, the signal processing facilities are adapted to perform at least one of digital signal processing, encoding, decoding, encrypting, decrypting, compressing, decompressing, analog-to-digital conversion (ADC), digital-to-analog conversion (DAC), and error correction.

According to a seventh aspect of the invention, the display device employs one of a liquid crystal display (LCD), light emitting diodes (LEDs), and a gas plasma.

According to an eighth aspect of the invention, the liquid crystal display is based upon one of active matrix technology and passive matrix technology.

According to a ninth aspect of the invention, the display device employs touch screen technology.

According to a tenth aspect of the invention, the display device includes one of picture-in-picture and split screen capability.

According to an eleventh aspect of the invention, the at least one wireless transmitter includes at least one multiplexor adapted to select a specific input device whose audio output is to be wirelessly transmitted to the at least one wireless headphone set.

According to a twelfth aspect of the invention, the at least one wireless transmitter is adapted to wirelessly transmit the audio signals to the at least one wireless headphone set as a left audio channel and a right audio channel.

According to a thirteenth aspect of the invention, the left audio channel and the right audio channel correspond to different frequencies.

According to a fourteenth aspect of the invention, the at least one wireless headphone set includes a plurality of wireless headphone sets and the at least one wireless transmitter is adapted to wirelessly transmit the audio signals to each of the plurality of wireless headphone sets as a left audio channel and a right audio channel. Each of the channels have a different frequency for each of the plurality of wireless headphone sets.

According to a fifteenth aspect of the invention, the bus includes a video bus and an audio bus.

According to a sixteenth aspect of the invention, the video bus is coupled to the display device and the audio bus is coupled to the at least one wireless transmitter.

According to a seventeenth aspect of the invention, the at least one wireless transmitter includes an optical transmitting device and the at least one wireless headphone set includes a photosensitive device.

According to an eighteenth aspect of the invention, the at least one wireless transmitter and the at least one wireless headphone set include an antenna.

According to a nineteenth aspect of the invention, the at least one wireless headphone set includes a digital-to-analog converter.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1A:
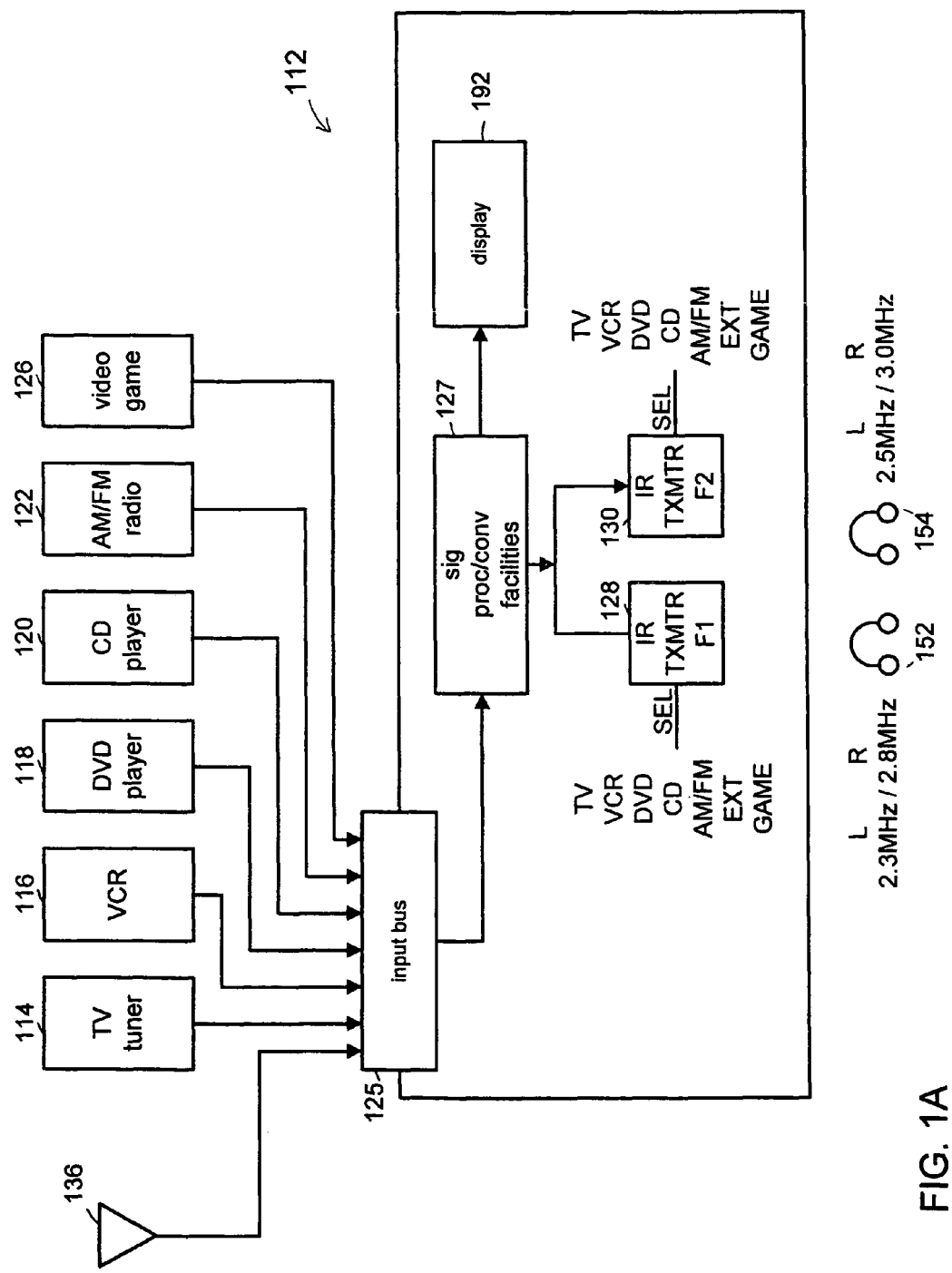
FIG. 1A is a block diagram illustrating the elements of a display device for a vehicle according to an illustrative embodiment of the invention.

It is to be understood that the present invention may be implemented in various forms of hardware, software, firmware, special purpose processors, or a combination thereof. Preferably, the present invention is implemented as a combination of both hardware and software, the software being an application program tangibly embodied on a program storage device. The application program may be uploaded to, and executed by, a machine comprising any suitable architecture. The machine may be implemented on a computer platform having hardware such as one or more central processing units (CPU), a random access memory (RAM), and input/output (I/O) interface(s). The computer platform may also include an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

To facilitate a clear understanding of the present invention, a brief description of the invention will now be given, followed by a more detailed description with respect to FIGS. 1-3. As noted above, the invention is directed to a display device for a vehicle. The display device mounts at a rear portion of a vehicle seat, with audio being supplied to the vehicle passengers by a wireless transmitter included in the display device. The passengers receive the transmitted audio through wireless headphones. Thus, only passengers desiring to receive the audio are provided with the same through the wireless headphones. Passengers desiring a quiet environment are not disrupted by the reproduction of the audio. As is known to one of ordinary skill in the related art, the wireless headphones will include a wireless receiver for receiving the wireless signals transmitted by the wireless transmitter of the display device.

It is to be appreciated that the display device of the invention may include more than one wireless transmitter. In such a case, different listeners may simultaneously listen to different audio outputs. For example, if a video cassette player (VCP) and a compact disk (CD) player are coupled to the display device through an included interface, then one vehicle passenger may listen to the audio output corresponding to the VCP while another vehicle passenger may listen to the audio output corresponding to the CD player. Thus, the display device need not be coupled to external devices that include a video output. Further, since the display device of the invention may include picture-in-picture capability, two vehicle passengers may simultaneously watch and listen to two different movies.

It is to be appreciated that the wireless signals can be any type of wireless signal including, but not limited to, radio frequency and infrared signals. It is to be noted that the current transmission capability (bandwidth) of infrared signals is approximately 1.5 to 2.0 Mbits/sec, with a maximum projected bandwidth of 16 Mbits/sec.

FIG. 1A is a block diagram illustrating the elements of a display device 112 for a vehicle according to an illustrative embodiment of the invention. The display device 112 mounts at a rear portion of a vehicle seat. The display device 112 includes a first wireless transmitter 128, a second wireless transmitter 130, a receiver 125, facilities for performing signal processing and/or signal conversion 127 (hereinafter "signal processing/conversion facilities"), and a display 192 (e.g., screen and rendering portion). The display device 112 is intended to interface with at least one of the following through the receiver 125: a TV tuner 114, a video cassette player (VCP) 116, a digital video disk (DVD) player 118, a compact disk (CD) player 120, an amplitude modulation/frequency modulation (AM/FM) radio 122, a video game player 126, and so forth.

The TV tuner 114, the VCP 116, the DVD player 118, the CD player 120, the AM/FM radio 122, and the video game player 126 may also be collectively referred to herein as input devices 190. It is to be appreciated that the devices described above with respect to the input devices 190 are merely illustrative and, thus, other devices may also be employed in accordance with the invention, while maintaining the spirit and scope thereof.

The receiver 125 may include a bus for receiving audio and video signals. Moreover, the receiver 125 may include separate buses for receiving the audio and video signals.

The first wireless transmitter 128 and the second wireless transmitter 130 each have multiplexing capabilities to enable the selection of a particular device (e.g., one of the input devices 190) whose audio signal is to be wirelessly transmitted. Selection is made through a SELECT (SEL) input. of course, wireless transmitters without such multiplexing capabilities may also be used; however, in such a case, a separate multiplexor(s) would be coupled between such transmitters and the audio outputs of the input devices 190.

The elements of the display device 112 are intended to interact with a first wireless headphone set 152 and a second wireless headphone set 154. It is to be appreciated that while the illustrative embodiment of FIG. 1A is shown with two wireless headphone sets (i.e., 152, 154), the invention is not so limited and, thus, any number of wireless headphone sets may be used in conjunction with the invention. For example, one or more headphones may be used (e.g., one wireless headphone set for each passenger).

The first wireless transmitter 128 and the second wireless transmitter 130 transmit wireless signals to the first wireless headphone set 152 and the second wireless headphone set 154, respectively. Of course, other configurations are possible which maintain the spirit and scope of the invention, as readily contemplated by one of ordinary skill in the related art.

An antenna 136 may be located within or external to the vehicle. For example, antenna 136 may be the original antenna included in the vehicle, which is typically used to receive frequencies associated with AM/FM radio stations and television stations. Such an antenna is typically located in the windshield or protruding from the exterior of the vehicle. Moreover, the antenna 136 may be a special purpose antenna, capability of receiving frequencies corresponding to, for example, satellite communications from a satellite or satellite network. The satellite communications may include movies and other media types (e.g., music, global navigation data, e-mail, and so forth). of course, the antenna 136 may receive various media types (including those mentioned above)from other types of transmission networks (e.g., land-based). In any event, the antenna 136 is coupled to the display device 112 through the receiver 125.

It is to be appreciated that the display device 112 is not limited to any particular kind of display device. Accordingly, display devices may be used which include, but are not limited to, liquid crystal displays (LCDs), light emitting diodes (LEDs), and gas plasma. It is to further appreciated that any variations of the aforementioned types of displays may be used. For example, with respect to liquid crystal displays, active matrix (e.g., thin film transistor) technology or passive matrix (e.g., dual scan) technology may be employed. The display device 112 may also employ touch screen technology, so that users can interact with the console by either touching the screen or placing a specified device (e.g., electrostatic pen) near the screen. In a preferred embodiment of the invention, a liquid crystal display is employed which uses active matrix technology.

In the case when display device 112 includes picture-in-picture or split screen capability, two or more different input devices 190 (e.g., the DVD player 118 and the TV tuner 114) may be input to the display device 112 through the receiver 125. In such a case, additional multiplexors (not shown) may be employed to determine which display window is to reproduce a particular video signal from a plurality of video signals. Given the teachings of the invention provided herein, one of ordinary skill in the related art will contemplate these and various other variations and configurations of the elements of the invention, while maintaining the spirit and the scope thereof.

The signal processing/conversion facilities 127, which is operatively coupled to the receiver 125, may perform such processing/conversion prior to any video signals being provided to the display device 112 and any audio signals being provided to the wireless transmitters 128 and 130. Of course, other arrangements are possible, including having separate signal processing/conversion facilities for the video signals and the audio signals.

The signal processing/conversion facilities 127 provides the audio signals input to the receiver 125 to the wireless transmitters 128, 130, and provides the video signals input to the receiver 125 to the display (e.g., screen and rendering portion).

The signal processing/conversion facilities 127 may include, but are not limited to, Digital Signal Processors (DSPs), and facilities for performing encoding/decoding, encrypting/decrypting, compressing/decompressing, analog-to-digital conversion (ADC), digital-to-analog conversion (DAC), error correction, and filtering. Such error correction may include, but is not limited to, Cyclic Redundancy Checking (CRC), Error Correction Code or Error Checking and Correcting (ECC), checksum, and so forth. With respect to, for example, encoding/decoding, encrypting/decrypting, and compressing/decompressing, the former of each pair may be performed by any of the input devices and the latter is performed by the signal processing/conversion facilities 127.

It is to be noted that the wireless signals may be encoded to prevent interference between the two wireless headphone sets 152, 154. Such encoding may be based on technologies such as, for example, spread spectrum technology.

In many cases, the facilities described above may be implemented by one or more codecs. In other cases, additional and/or other circuitry may be required. It is to be appreciated that one of ordinary skill in the related art will contemplate these and various other facilities for performing signal processing and/or signal conversion, while maintaining the spirit and scope of the invention.

Figure 1B:
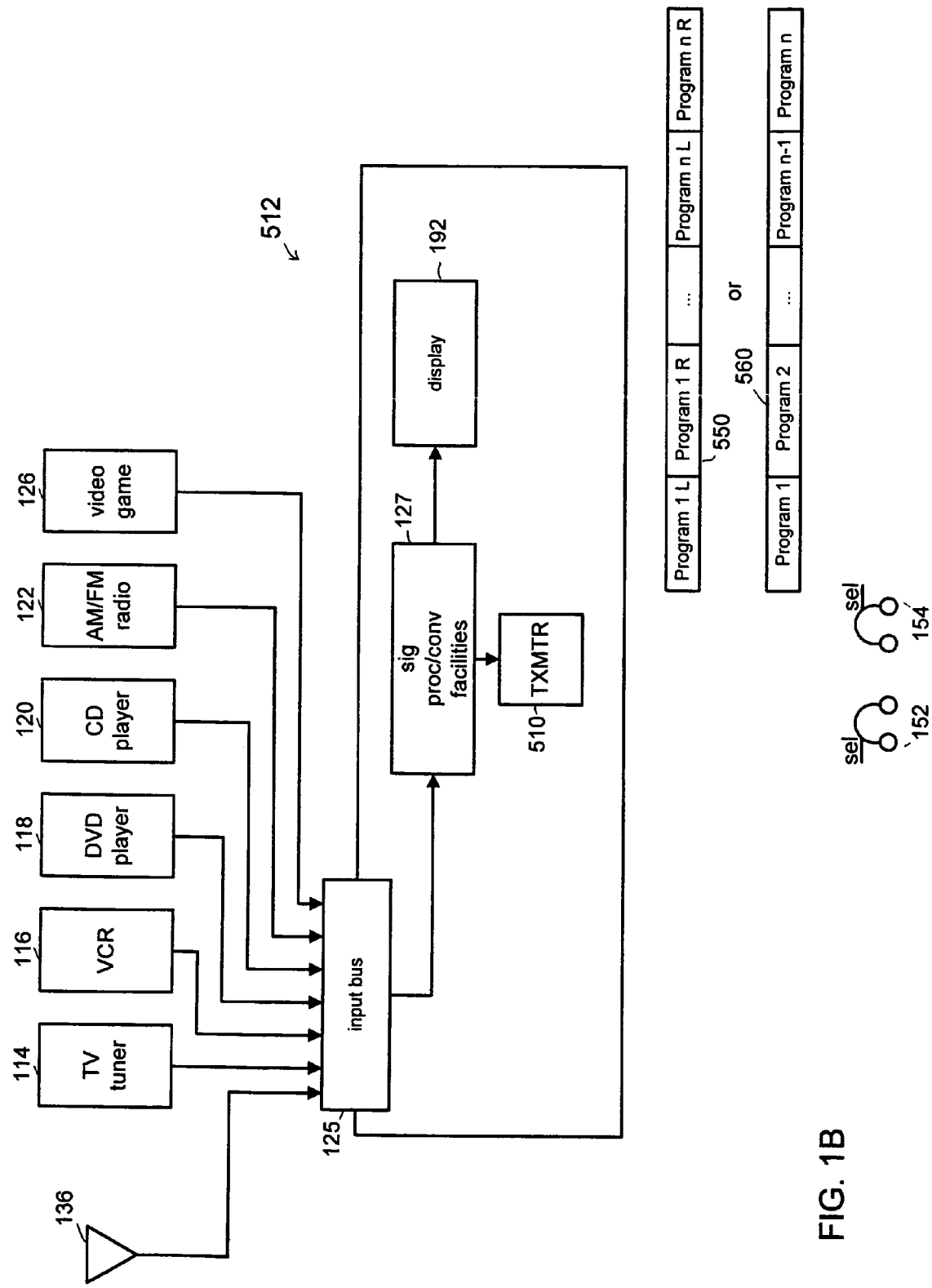
FIG. 1B is a block diagram illustrating the elements of a display device for a vehicle according to another illustrative embodiment of the invention.

FIG. 1B is a block diagram illustrating the elements of a display device 512 for a vehicle according to another illustrative embodiment of the invention.

The display device 512 includes a wireless transmitter 510, a receiver 125, signal processing/conversion facilities 127, and a display 192 (e.g., screen and rendering portion). The display device 112 is intended to interface with the input devices 190.

Similar to the display device 112 of FIG. 1A, the display device 512 of FIG. 1B is intended to interact with a plurality of wireless headphone sets. For illustrative purposes, the first wireless headphone set 152 and the second wireless headphone set 154 are shown.

It is to be appreciated that the main difference between the display device 112 of FIG. 1A and the display device 512 of FIG. 1B is that the first and the second wireless transmitters 128, 130 have been replaced by the wireless transmitter 510 of FIG. 1B, the latter for wirelessly transmitting the audio signals (hereinafter also referred to as "audio programs", with each input device outputting a particular audio program) based upon Code-Division Multiple Access (CDMA) technology. The coding and other related operations may be performed by the wireless transmitter 510 and/or by the signal processing/conversion facilities 127. In any event, the requisite circuitry for implementing CDMA technology would be required both on the transmission end (the display device) and the receiving end (the wireless headphone sets). Such circuitry may include, for example, convolutional encoders, Walsh code generators and PN (pseudo random number) sequence generators, combiners, modulators, de-modulators, correlators, digital-to-analog converters (DACs), analog-to-digital converters (ADCs), and so forth. Given the teachings of the invention provided herein, one of ordinary skill in the related art will readily contemplate the elements required to implement CDMA in a display device according to the invention, while maintaining the spirit and scope thereof.

It is to be appreciated that the use of CDMA technology enables a single transmitter (i.e., wireless transmitter 510) to transmit all programs simultaneously, with a user being able to select the program he or she intends to hear via a selector located on, for example, his or her wireless headphone set. Moreover, the use of CDMA technology enables all of the available frequency bandwidth to be used, while simultaneously minimizing interference.

According to one illustrative embodiment of the invention, the audio programs may be pre-stored in a memory system such that pre-specified memory locations are used to store specific audio programs (i.e., a pre-defined mapping). Of course, a dynamic mapping approach may also be employed.

In either case, a memory addressing scheme may be used to write the programs into memory and read them therefrom. A processor and governing program or operating system may be employed to control the memory operations. The processor, governing program or operating system, and memory system may be implemented as part of the signal processing/conversion facilities 127, the wireless transmitter 510, a combination thereof, or separately as independent elements of the display device 512. Of course, other arrangements are possible and readily contemplated by one of ordinary skill in the art.

It is to be appreciated that the audio programs need not be stored but may be directly processed by, e.g., the signal processing/conversion facilities 127 and/or the wireless transmitter 510 in real-time (or with slight delay) for the purposes of transmitting in CDMA format. Given the teachings of the invention provided herein, one of ordinary skill in the related art will contemplate these and various other arrangements for implementing the invention, while maintaining the spirit and scope thereof.

In the illustrative embodiment of FIG. 1B, the wireless signals (audio programs) are shown transmitted in two distinct ways. In the first approach 550, the left and right audio channels of each of the plurality of audio programs are transmitted as separate streams. In the second approach 560, the left and right audio channels of each of the plurality of audio programs are combined onto a single stream. In the latter case, separation of the channels is performed in the wireless headphone sets. In any event, the plurality of audio programs are then combined, superimposed onto a carrier frequency, and transmitted by the wireless transmitter 510 for receipt by the wireless headphone sets. These and various other ways in which to transmit a plurality of audio programs to a plurality of wireless headphones sets may be readily contemplated and implemented by those of ordinary skill in the art, while maintaining the spirit and scope of the invention.

Figure 2:
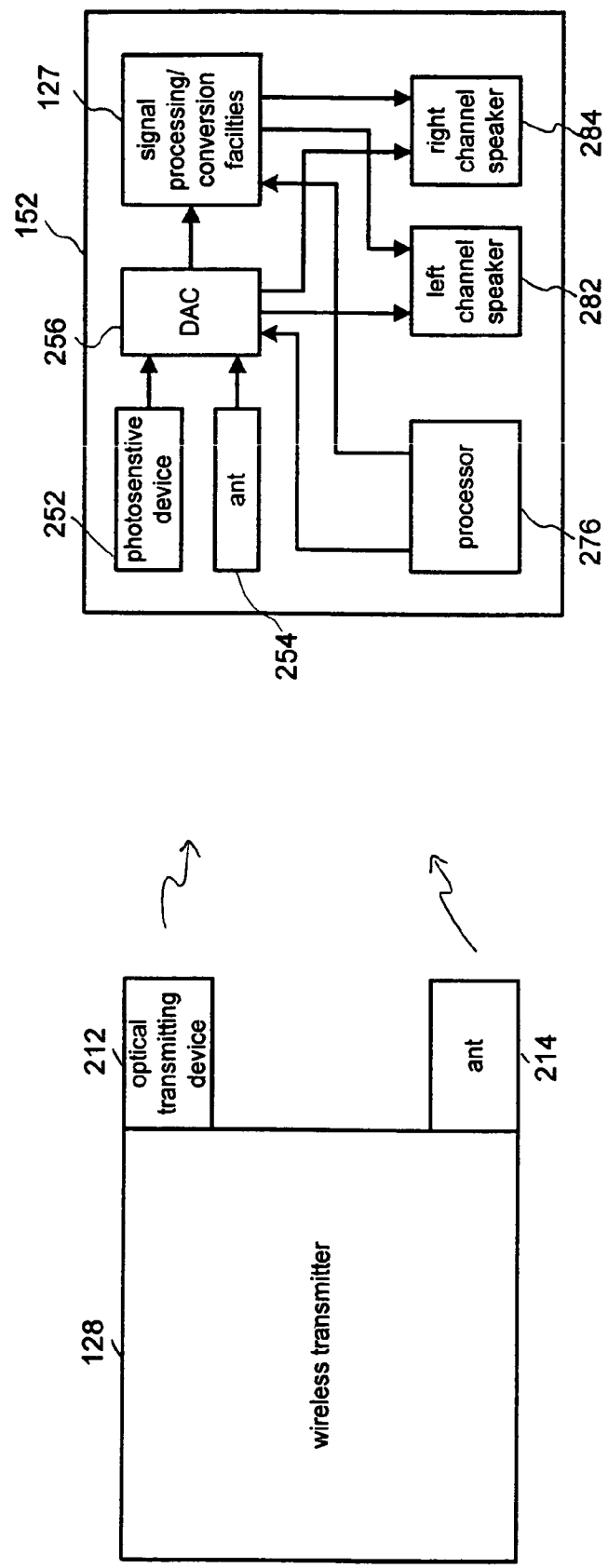
FIG. 2 is a diagram illustrating a wireless transmitter interacting with a wireless headphone set based on optical and/or RF transmission, according to an illustrative embodiment of the invention.

FIG. 2 is a diagram illustrating the wireless transmitter 128 interacting with the wireless headphone set 152 based on optical and/or RF transmission, according to an illustrative embodiment of the invention. It is to be appreciated that the following description is also applicable to the wireless transmitters 130 and/or 510. The wireless transmitter 128 includes an optical transmitting device 212 (e.g., an LED, a laser, and so forth) and an antenna 214. The wireless headphone set 152 includes a photosensitive device 252 (e.g., a phototransistor, a solar cell(s), a SEED (self-optic effect device), and so forth) and an antenna 254. The optical transmitting device 212 and the photosensitive device 252 are used for wireless transmission and reception of optical signals, respectively. The antenna 214 and the antenna 254 are used for wireless transmission and reception of RF signals, respectively.

In the case of wireless optical transmission, the optical transmitting device 212 wirelessly transmits optical (digital) signals to the wireless headphone set 152 by pulsing its light output (e.g., off equals a zero (0) and on equals a one (1)). The photosensitive device 252 in the wireless headphone set 152 detects the optical signals wirelessly transmitted by the optical transmitting device 212.

The wireless headphone set 152 also includes a digital-to-analog converter (DAC) 256 for converting the digital signals into analog signals. The analog signals are then provided to a left channel speaker 282 and a right channel speaker 284 either directly or after processing by another signal processing/conversion facilities 197. For example, in the latter case, the DAC 256 may simply convert the wireless digital signal to a composite analog signal, which is then separated by the other signal processing/conversion facilities 197 into right and left audio channels (when the DAC 256 is separate from the signal processing/conversion facilities 197). Other processing by the signal processing/conversion facilities 197 may include, for example, filtering of the analog signals.

It is to be appreciated that different frequencies may be used for right channels and left channels. For example, as shown in FIG. 1A, the wireless headphone set 152 receives a left channel audio signal corresponding to 2.3 MHz and a right channel audio signal corresponding to 2.8 MHz, while the wireless headphone set 154 receives a left channel audio signal corresponding to 2.5 MHz and a right channel audio signal corresponding to 3.0 MHz. Such an arrangement allows for more than one wireless headphone set to be actively used without frequency interference therebetween. Given the teachings of the invention provided herein, one of ordinary skill in the related art will contemplate these and other approaches for facilitating wireless transmission between the wireless transmitters 128, 130 and the wireless headphone sets 152, 154 while maintaining the spirit and scope of the invention.

It is to be appreciated that a processor 276 may be used to control the functions of the DAC 256 and the signal processing/conversion facilities 197. It is to be further appreciated that the DAC 256 may be separate from (as shown) or part of the signal processing/conversion facilities 197.

The preceding description regarding the functions of the DAC 256 and the signal processing/conversion facilities 197 may also be applied in the case of RF transmission. In such a case, the transmission and reception functions of the optical transmitting device 212 and the photosensitive device 252 are replaced by those of the antennas 214 and 254, respectively. That is, the antenna 214 is used to wirelessly transmit an RF signal which is then received by the antenna 254. A modulator/demodulator may be included or associated with the antennas 214 and 254 to perform such functions as are known to one of ordinary skill in the related art.

Given the teachings of the invention provided herein, one of ordinary skill in the related art will contemplate these and other optical transmitting devices, photosensitive devices, and configurations of the elements of the invention which allow for the transmission and reception of any type of wireless signal (e.g., analog and digital) and appropriate processing/conversion to facilitate reproduction of the content of the wireless signals provided by the wireless transmitters 128, 130.

The preceding description of the display device 112 has primarily focused on features that may be included in the display device 112 to enhance the operation thereof. A description of mounting arrangements for the display device 112 will now be given.

Figure 3:
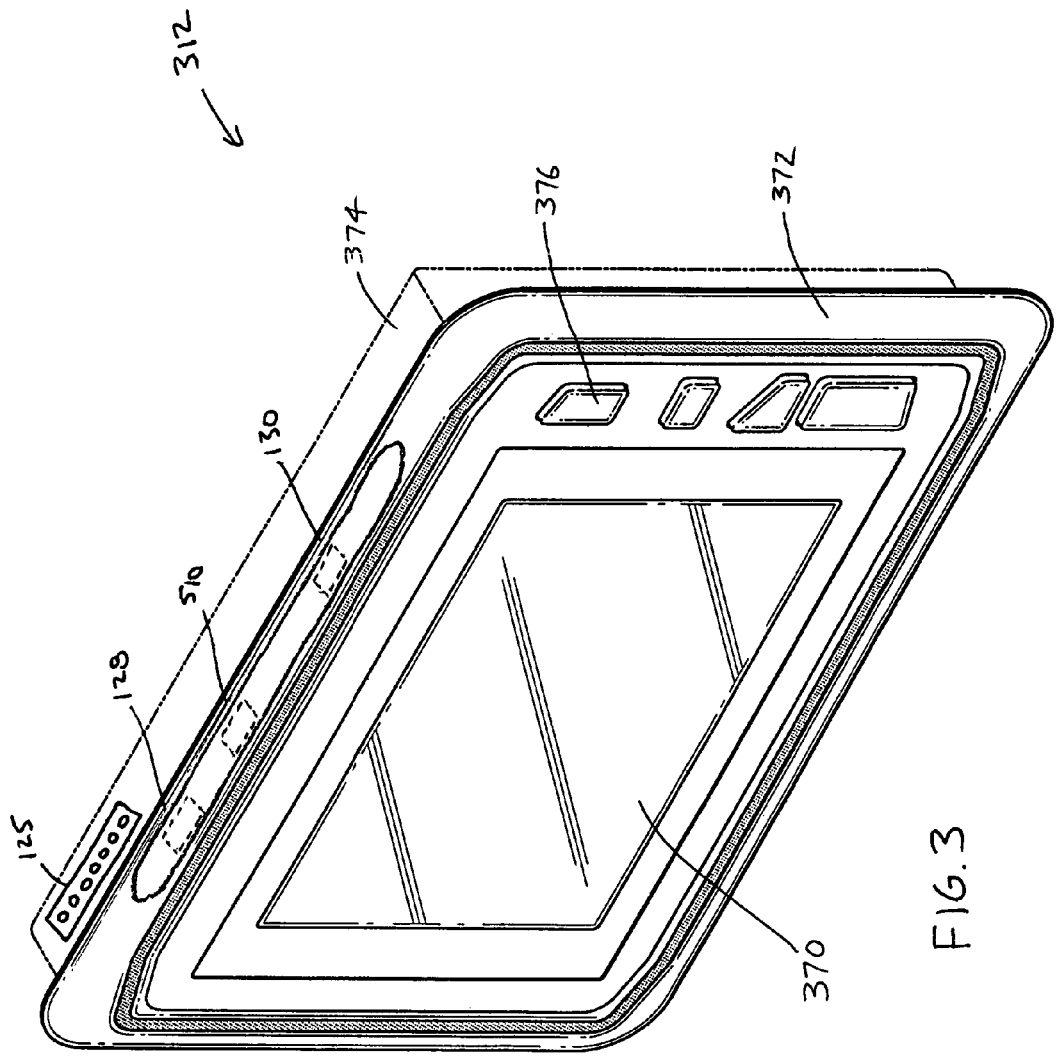
FIG. 3 is a block diagram illustrating a display device for a vehicle according to an illustrative embodiment of the invention.

FIG. 3 is a block diagram illustrating a display device 312 for a vehicle according to an illustrative embodiment of the invention. FIG. 3 is shown with the minimum number of elements, so that the mounting arrangement of the display device is emphasized. In particular, the display device 312 is mounted on the rear of a seat of the vehicle. For example, the display device 312 can be mounted to the rear of a headrest or a body of a seat of the vehicle.

As shown in FIG. 3, the display device 312 includes a display screen 370, which includes, for example, an LCD, an LED display, a gas plasma display, or an organic electroluminescent display (OELD). The display device 312 includes a face portion 372 and a rear portion 374. The wireless transmitters 128, 130 and/or 510 are positioned on the face portion 372. The face portion also includes the display screen 370 and control buttons 376 for controlling, for example, display features, such as brightness and contrast, etc. and/or program functions, such as stop, play, pause, etc.

When mounted in a vehicle seat, the rear portion 374 is positioned in the vehicle seat so that the face portion 372 sits substantially flush with the surface of the seat. For example, the face portion 372 is substantially flush with the rear surface of a headrest or the rear surface of a seat body so that a passenger(s) sitting to the rear of the vehicle seat can view the display screen 370 and the display device 312 occupies a limited amount of space for the comfort of the passenger(s). The face portion 372 has a larger length and width (i.e., area) than the rear portion 374. The larger area of the face portion 372 permits the face portion 372 to sit substantially flush with the surface of the seat when the rear portion 374 is inserted into a hole in the seat having an area substantially equal to that of the rear portion 374. The face portion 372 is also thinner than the rear portion 374 so as to permit the face portion to sit substantially flush with the seat surface when the rear portion 374 is positioned in the seat. It is to be understood that, depending on installation procedures and the flexibility of the seat surface, the face portion 372 may sit: (1) on the seat surface; (2) even with the seat surface; (3) just below the seat surface; or (4) as a combination of all or some of the foregoing and still be considered substantially flush with the seat surface.

The rear portion 374 may be secured, with screws or other fasteners known to one of ordinary skill in the art, to an internal support structure of the seat, such as vertical or horizontal support members within the seat.

The display device 312 includes the first wireless transmitter 128, the second wireless transmitter 130, and the receiver 125. Also shown with a dashed line is the wireless transmitter 510, which may be employed in embodiments of the invention which implement CDMA technology. The following description, however, will be directed to the first and the second wireless transmitters 128, 130. The video and audio signals from the input devices 190 are provided to the display device 312 through the receiver 125. In a preferred embodiment, the receiver 125 includes separate inputs for video signals and audio signals. Of course, other arrangements are possible, including, but not limited to, inputs for receiving composite video and audio signals, or altogether separate buses for video and audio, which corresponding processing circuitry for each.

As shown in FIG. 3, the receiver 125 is positioned on the rear portion 374 and includes inputs for video signals and audio signals. When the rear portion 374 is mounted in a seat, wires carrying the video and audio signals from the input devices 190 may be fed through the seat to the receiver 125. In addition, any power connections, such as a connection from a vehicle power supply to the display device 312, can also run through the seat into the rear portion 374.

It is to be appreciated that while the display device 312 is shown to include two wireless transmitters (128, 130), any number of wireless transmitters may be employed including only one wireless transmitter. It is to be further appreciated that the locations of the wireless transmitters 128, 130 in FIG. 3 are merely illustrative. Such transmitters (including the case when only one transmitter is used) may be located anywhere on or in the display device. For example, a transmitter(s) may be located on the top, bottom, side, front, or rear of the display device. The transmitter may be flush, fully or partial protruding with respect to one or more surfaces of the display devices. Given the teachings of the invention provided herein, one of ordinary skill in the related art will contemplate these and various other locations and configurations of the wireless transmitters that are employed by the display device.

Associated with the display device 312 of FIG. 3 are the first wireless headphone set 152 and the second wireless headphone set 154 (not shown), which receive wireless signals from the first wireless transmitter 128 and the second wireless transmitter 130, respectively.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A display device for a vehicle having a seat, comprising:
an assembly housing, wherein at least a portion of the assembly housing is adapted to be mounted in the seat;
at least one media source operatively coupled to the display device for providing at least one of video and audio signals from the at least one media source to the display device; and
at least one wireless transmitter adapted to wirelessly transmit the audio signals to at least one wireless receiver or speaker, wherein the assembly housing includes a face portion and a rear portion, the face portion has a larger area than the rear portion, and the rear portion is positioned in a hole in the seat having an area substantially equal to that of the rear portion and the face portion rests outside of the hole on an outside surface of the seat, wherein the face portion protrudes beyond the outside surface of the seat, and wherein the rear portion is secured to an internal support structure of the seat.

2. The display device according to claim 1, wherein the portion of the assembly housing is mounted in a headrest of the seat.

3. The display device according to claim 1, wherein the portion of the assembly housing is mounted in a body of the seat.

4. The display device according to claim 1, wherein the rear portion is mounted in the seat and the face portion is substantially flush with the outside surface of the seat.

5. The display device according to claim 4, wherein the face portion has a smaller thickness than the rear portion.

6. The display device according claim 4, further comprising a receiver located on the rear portion, wherein the receiver is operatively coupled to the at least one media source through at least one wire positioned in the seat.

7. The display device according to claim 6, wherein the receiver receives at least one of the video and audio signals from the at least one media source.

8. The display device according claim 4, further comprising a receiver located on the rear portion, wherein the receiver is operatively coupled to a vehicle power supply through at least one wire positioned in the seat.

9. The display device according to claim 1, wherein the at least one wireless transmitter is positioned on the face portion.

10. The display device according to claim 1, wherein the audio signals are wirelessly transmitted as at least one of radio frequency and infrared signals.

11. The display device according to claim 1, wherein the at least one media source includes at least one of a television tuner, a video cassette player (VCP), a compact disk (CD) player, a digital video disk (DVD) player, an AM/FM radio, a video game player, global navigation data, and e-mail.

12. The display device according to claim 1, wherein the display device employs one of a liquid crystal display (LCD), light emitting diodes (LEDs), gas plasma and an organic electroluminescent display (OELD).

13. The display device according to claim 1, wherein the at least one wireless transmitter is adapted to transmit the audio signals based on Code-Division Multiple Access (CDMA) technology.

14. A display device for a vehicle having a seat, comprising:
   an assembly housing, wherein at least a portion of the assembly housing is adapted to be mounted in the seat;
   at least two media sources operatively coupled to the display device for providing at least one of audio and video signals from the at least two media sources to the display device; and
   a wireless transmitter adapted to wirelessly transmit the audio signals from the at least two media sources to at least one wireless receiver or speaker, wherein the assembly housing includes a face portion and a rear portion, the face portion has a larger area than the rear portion, and the rear portion is positioned in a hole in the seat having an area substantially equal to that of the rear portion and the face portion rests outside of the hole on an outside surface of the seat, wherein the face portion protrudes beyond the outside surface of the seat, and wherein the rear portion is secured to an internal support structure of the seat.

15. The display device according to claim 14, wherein the wireless transmitter simultaneously transmits the audio signals from the at least two media sources to the at least one wireless receiver or speaker.

16. The display device according to claim 14, wherein the wireless transmitter simultaneously transmits the audio signals from the at least two media sources to the at least one wireless receiver or speaker and to at least one other wireless receiver or speaker.

17. The display device according to claim 14, further comprising at least one multiplexer adapted to select a media source of the at least two media sources whose audio output is to be wirelessly transmitted to the at least one wireless receiver or speaker.

18. The display device according to claim 14, wherein the portion of the assembly housing is mounted in a headrest of the seat.

19. The display device according to claim 14, wherein the portion of the assembly housing is mounted in a body of the seat.

20. The display device according to claim 14, wherein the rear portion is mounted in the seat and the face portion is substantially flush with the outside surface of the seat.

21. The display device according to claim 20, wherein the face portion has a smaller thickness than the rear portion.

22. The display device according claim 20, further comprising a receiver located on the rear portion, wherein the receiver is operatively coupled to the at least two media sources through at least one wire positioned in the seat.

23. The display device according to claim 22, wherein the receiver receives at least one of the video and audio signals from the at least two media sources.

24. The display device according claim 20, further comprising a receiver located on the rear portion, wherein the receiver is operatively coupled to a vehicle power supply through at least one wire positioned in the seat.

25. The display device according to claim 14, wherein the wireless transmitter is positioned on the face portion.

26. A display device for a vehicle having a seat, comprising:
   an assembly housing, wherein at least a portion of the assembly housing is adapted to be mounted in the seat;
   at least two media sources operatively coupled to the display device for providing at least one of audio and video signals from the at least two media sources to the display device; and
   at least two wireless transmitters adapted to wirelessly transmit the audio signals from the at least two media sources to a plurality of wireless receivers or speakers, wherein the assembly housing includes a face portion and a rear portion, the face portion has a larger area than the rear portion, and the rear portion is positioned in a hole in the seat having an area substantially equal to that of the rear portion and the face portion rests outside of the hole on an outside surface of the seat, wherein the face portion protrudes beyond the outside surface of the seat, and wherein the rear portion is secured to an internal support structure of the seat.

27. The display device according to claim 26, wherein a first wireless transmitter is adapted to wirelessly transmit audio signals from one of the at least two media sources to a first wireless receiver or speaker, and wherein a second wireless transmitter is adapted to wirelessly transmit audio signals from another of the at least two input sources to a second wireless receiver or speaker.

28. The display device according to claim 27, wherein the first and second wireless transmitters simultaneously transmit the audio signals from the at least two media sources to the first and second wireless receivers or speakers.

29. The display device according to claim 27, wherein each of the first and second wireless transmitters are operatively coupled to a multiplexer for selecting the one or the other of the two input sources whose audio signals are to be wirelessly transmitted.

30. The display device according to claim 26, wherein the portion of the assembly housing is mounted in a headrest of the seat.

31. The display device according to claim 26, wherein the portion of the assembly housing is mounted in a body of the seat.

32. The display device according to claim 26, wherein the rear portion is mounted in the seat and the face portion is substantially flush with the outside surface of the seat.

33. The display device according to claim 32, wherein the face portion has a smaller thickness than the rear portion.

34. The display device according claim 32, further comprising a receiver located on the rear portion, wherein the receiver is operatively coupled to the at least two media sources through at least one wire positioned in the seat.

35. The display device according to claim 34, wherein the receiver receives at least one of the video and audio signals from the at least two media sources.

36. The display device according claim 32, further comprising a receiver located on the rear portion, wherein the receiver is operatively coupled to a vehicle power supply through at least one wire positioned in the seat.

37. The display device according to claim 26, wherein the at least two wireless transmitters are positioned on the face portion.

38. A display device for a vehicle having a seat, comprising:
   an assembly housing, wherein the assembly housing is adapted to be mounted in the seat;

at least one media source operatively coupled to the display device for providing at least one of video and audio signals from the at least one media source to the display device; and at least one wireless transmitter adapted to wirelessly transmit the audio signals to at least one wireless receiver or speaker, wherein the assembly housing includes a face portion and a rear portion, the face portion has a larger area than the rear portion, and the rear portion is positioned in a hole in the seat having an area substantially equal to that of the rear portion and the face portion rests outside of the hole on an outside surface of the seat, wherein the face portion protrudes beyond the outside surface of the seat, and wherein the rear portion is secured to an internal support structure of the seat.

39. The display device according to claim 38, wherein the assembly housing is mounted in a headrest of the seat.

40. The display device according to claim 38, wherein the assembly housing is mounted in a body of the seat.

41. The display device according to claim 38, wherein the internal support structure is a vertical support member within the seat.

42. The display device of according to claim 38, wherein the internal support structure is a horizontal support member within the seat.

* * * * *